United States Patent Office 3,560,159
Patented Feb. 2, 1971

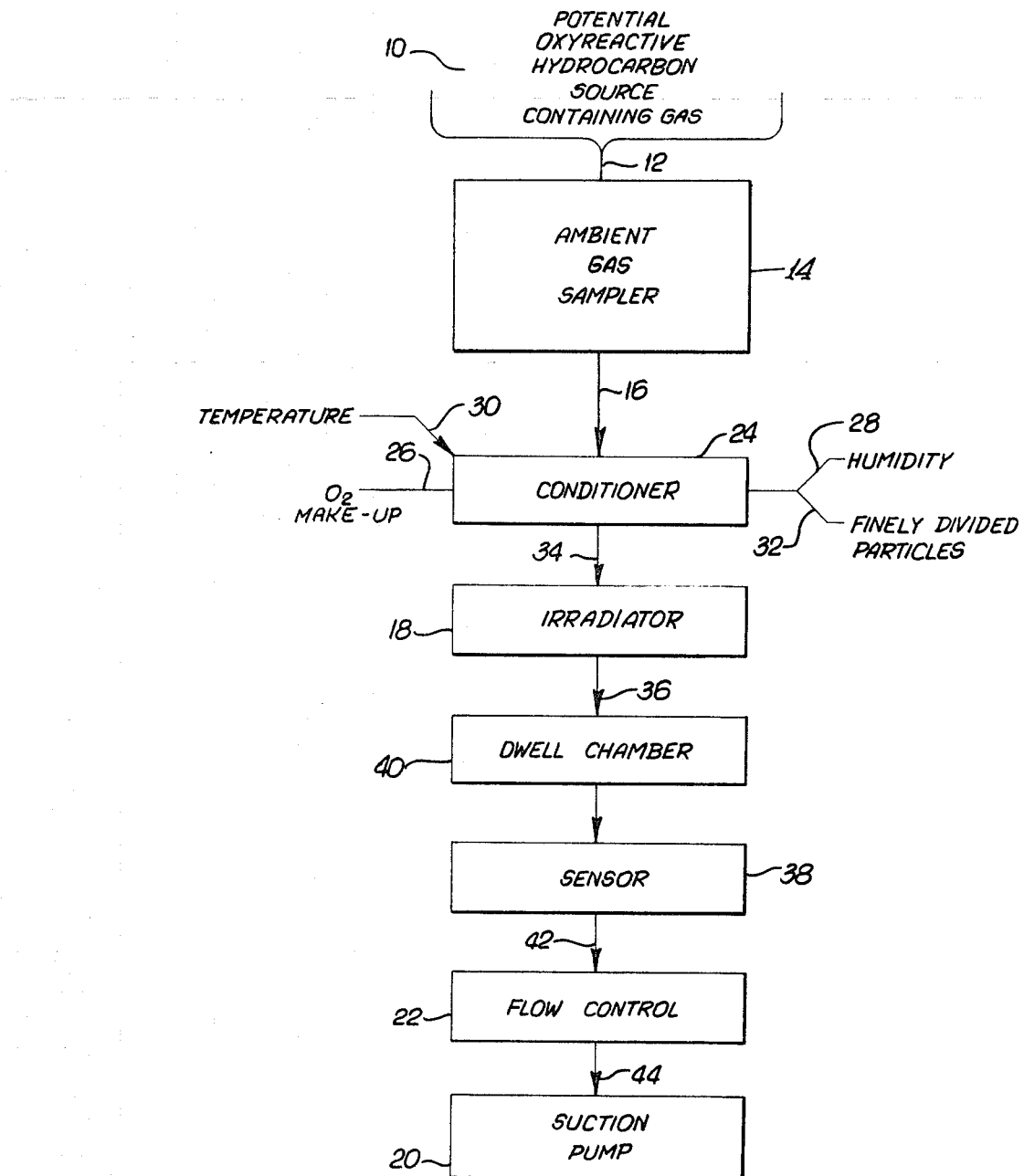

3,560,159
METHOD FOR DETECTING HIGHLY LOCALIZED SOURCES OF OXYREACTIVE HYDROCARBONS USING ULTRAVIOLET IRRADIATION
Alexander Goetz, Altadena, Calif., assignor to Alexander Goetz, as trustee of the Goetz family trust
Filed Sept. 26, 1967, Ser. No. 670,713
Int. Cl. G01n *21/12, 21/34*
U.S. Cl. 23—232   19 Claims

ABSTRACT OF THE DISCLOSURE

Detection of localized sources of oxyreactive hydrocarbons emitted into ambient gases is accomplished by converting in the gas the emitted molecularly disperse, normally nondetectable hydrocarbons into detectable particulates and inspecting the gas for the presence or absence of these particulates to reveal the presence or absence of such hydrocarbons in the gas. This invention provides extremely sensitive indication of such localized hydrocarbon sources as subsurface oil deposits, trespassing personnel and leaks in fluid container walls.

BACKGROUND OF THE INVENTION

(1) Field of the invention

This invention is concerned with detection in a gas of oxyreactive hydrocarbons emitted even in low parts per million concentration from highly localized sources. The invention has to do broadly with method and apparatus for ascertaining the presence of such hydrocarbons as a means of revealing their proximate source. In general, then, the invention relates to surveillance devices and techniques with which to discover, police, monitor or otherwise inspect gases for the presence of oxyreactive hydrocarbon sources.

The term "oxyreactive hydrocarbon" herein has reference to hydrocarbons reactable with oxygen in response to excitation with radiant energy. Among such reactive hydrocarbons are those generally termed "unsaturated," e.g., those compounds which are olefinically or aromatically unsaturated.

(2) Prior art

While useful in many areas the following description will emphasize the value of the invention in several readily apparent applications as an illustration of the capabilities of the system described. In general, oil exploration is today carried on with elaborate equipment measuring geological characteristics of the subsurface. Actually extensive oil and gas deposits exude to the surface small quantities of oxyreactive hydrocarbons. Obviously, the detection of deposits would be greatly simplified if there were available means for detecting the presence of such exudate at the surface. This invention provides this means. Detection of personnel is of value in places ranging from jungle war zones to industrial property. Present systems rely on infrared radiation, heat sensors or other electronic gear, all of which are expensive and not easily calibrated to distinguish between personnel and background "noise" or false signals. Humans emit characteristic oxyreactive hydrocarbons for which the present apparatus can be tuned to discriminate from other materials to give true readings of the presence of unauthorized persons in any area from which a sample can be obtained. Industrial explosions are often caused by undue accumulations of hydrocarbons in the closed spaces surrounding process equipment. Detection of unsafe levels of such accumulation and appropriate action can serve to abort such explosive situations. The present apparatus provides means for such detection.

There exists, of course, many other applications for the present invention, in fact any application requiring information about an object which emits oxyreactive hydrocarbons into a gas is a potential market for my device and method. For example, rapid means of testing a container, e.g., for pipe leakage can be based on the passage or not of molecularly disperse oxyreactive hydrocarbons through the container wall, such passage to be sensed by the present inventive apparatus and method, as will be described.

SUMMARY OF THE INVENTION

This invention has for a major objective the detection of oxyreactive hydrocarbon sources present in a gas, for any purpose dependent on the presence or not of such a source.

In general, the invention is predicated on the ability to convert into detectable form the molecularly disperse and normally undetectable ovyreactive hydrocarbons emanating into an ambient gas from a source whose presence is suspected and inspecting the gas for the converted hydrocarbons.

In particular, the invention provides a method of detecting in a gas a localized source of molecularly disperse and normally undetectable oxyreactive hydrocarbons which includes taking a gas sample in the vicinity of the suspected source location, irradiating the sample to combine oxyreactive hydrocarbons therein, if any, into detectable particulates and inspecting the irradiated sample for the presence or absence of said particulates to correspondingly indicate the presence or absence of oxyreactive hydrocarbons in the sample and thus the location or not of the source in the sample vicinity. In general, the irradiation is effected through the use of far ultraviolet radiation, e.g., 2000 to 2850 angstroms wavelength, and particularly 2450 to 2650 angstroms wavelength and preferably in the presence of some humidity, i.e., molecularly disperse water and in some instances highly dispersed, finely divided, nonreactive particles such as crystallized salt, to serve as reaction centers.

Other than the radiation maximum wavelength, the parameters of the present method are widely variable. Pressure appears to play no major role and can range from subatmospheric to superatmospheric or most conveniently may be ambient, e.g., normal atmospheric pressure, i.e., 600–760 mm. Hg. Temperature and humidity both play a role in the conversion reaction. Sample temperatures may be varied from 5 to 95° C. or higher or lower with values up to that at which the particulates decompose too rapidly for detection being suitable. At these temperatures, water content levels corresponding to a relative humidity between 0 and 99 percent may be employed. Increasing humidity has been found to increase progressively, although not necessarily proportionally the number and size of particulates produced. As the sample temperature or humidity changes the relative reactivity of the various organic molecules present in the gas stream also appears to change. Thus, the present apparatus may be "tuned" by humidity or temperature adjustment to particular hydrocarbons. The sample will be oxygen-containing during irradiation either by virtue of being a portion of the atmosphere or through addition of oxygen to the sample prior to irradiation. Oxygen present in the gas sample enters into the particulate-forming reaction by combining with the oxyreactive hydrocarbons to form what are apparently polyethers, judging from solubility data obtained thereon. Quite small amounts of oxygen, in fact only the stoichiometric equivalent amount is needed to form such polymers, but typically, oxygen levels in the gas sample, either as obtained in the gas or as added to the gas sample should be at least ten times the hydrocarbon content, e.g., at least 10 to 1000 parts per million, and may range higher without limit but typically will be between 15% and 30%. Increased oxygen concentration will increase reaction rate.

The detectable particulates typically contain numerous polymers of at least 100 monomer units and up to 5000 or more units to correspondingly have molecular weights between 100 and 5000 times greater than that of the hydrocarbon constituents. These polymers are formed rapidly under far ultraviolet irradiation and agglomerate subsequently to form particulates in the size range of at least 0.1 and up to 1μ diameter.

The presence of highly dispersed submicron dimension particles in the irradiated sample, i.e., nongaseous and nonreactive matter such as salt crystals formed in situ, has been found to accelerate the reaction, perhaps through the provision of reaction centers or nuclei and such matter may be added to the gas sample prior to irradiation, to specially condition the sample.

Apparatus is provided for carrying out the above method including generally means for subjecting the selected gas sample, containing oxygen, to far ultraviolet light radiation to selectively combine the oxyreactive hydrocarbons into detectable particulates, generally in proportion to their concentration in the sample and means for detecting the presence of particulates to establish the presence or absence of oxyreactive hydrocarbons in the vicinity of the gas sample. The irradiating means may include a gas inlet and outlet and a passageway therebetween in which an ultraviolet light source, which may be a quartz lamp containing activatable mercury vapor, is located, connected to a power source sufficient to activate the vapor to radiating energy levels. The light source is preferably arranged in the passage to provide uniform exposure of the gas stream passing therethrough. Means for controlling flow rate, temperature, oxygen content and humidity of the gas in the passageway may be provided, as may means for incorporating finely divided, particulate nongaseous and nonreactive particles for increasing reaction rate. The apparatus will also include a sensing device which is responsive by a signal or otherwise to the presence of particulates in the sample as a result of irradiation.

While the present apparatus is useful as a test instrument on a one time basis it may be more or less permanently fixed in an area to constantly or intermittently monitor output of oxyreactive hydrocarbons by a source.

BRIEF DESCRIPTION OF THE DRAWINGS

In the drawings.—the single figure is a schematic of a typical detection instrument arrangement according to the invention.

DESCRIPTION OF THE PREFERRED EMBODIMENTS

It will be apparent from the foregoing that detection herein of oxyreactive hydrocarbons is predicated on the conversion of these normally difficultly detectable chemical species into a particulate, more easily detected form. The conversion of molecularly disperse oxyreactive hydrocarbons into particulates is apparently two-stage. First the hydrocarbons are chemically combined into larger molecules, polymers, and these polymers coalesce into agglomerates, i.e., aggregates of molecules which on reaching about 0.1μ particle size become detectable, e.g., by light scattering. Agglomerate growth may continue to form particulates of up to 1μ in diameter. This conversion generally takes only 3 to 100 seconds, enabling rapid indication of a source in a sample area.

With reference to the drawing, a gas is indicated at 10 which may include a source likely to produce, contain or evolve oxyreactive hydrocarbons. Communicating with gas 10 along line 12 for testing of the gas is sampler 14. The sampler 14 may be any impermeable, enclosed space constituting a chamber with means for collecting and discharging gaseous matter in controllable quantities. Connected to the sampler 14 along line 16 is an irradiator 18. It is within the irradiator 18 that the gas sample, drawn from ambient gas 10 and moved through sampler 14, is processed to render detectable the oxyreactive hydrocarbon content of the gas sample. The sample flows steadily through the irradiator 18 under the negative pressure produced in the apparatus by suction pump 20 which operates across a flow controller 22, e.g., a valve which can be set to vary the exposure duration in the irradiator 18.

The gas entering the irradiator 18 typically will comprise atmospheric gases including primarily nitrogen, oxygen, carbon dioxide, as well as molecularly disperse water together often with the gaseous products of combustion such as oxyreactive hydrocarbons and nitrogen oxides.

The irradiator 18 may comprise a gas impermeable tubular wall defining a passageway for the sample. The wall may be of any suitable material such as metal, e.g., stainless steel or glass, ceramic or light stable plastic. Within the passageway, a light source is typically provided including a lamp which may be formed of quartz and filled with an activatable mercury vapor. The lamp may be any device emitting radiation in the desired far ultraviolet range. Thus, devices having emission wavelengths below 2850 angstroms, inherently, or by appropriate filtering are useful with innocuous, narrower band, easily controlled radiating devices such as vapor lamps being preferred over other devices. Preferred devices will emit principally in the 2000 to 2850 angstrom wavelength range and preferably emit a minimum of 1800–1900 angstrom radiation, to minimize generation of ozone. Irradiation of 600 milliliters of gas for 5 to 50 seconds at wavelengths between 2450 and 2650 with a 5- to 50-watt lamp is quite effective for rapidly combining oxyreactive hydrocarbons into detectable particulates.

It will be noted that the radiation wavelengths employed herein are well below the visible light spectrum and fall into the far ultraviolet range. Thus, the radiation used to chemically combine the oxyreactive hydrocarbons in the present method and apparatus is not at a level occurring adacent the earth surface. Due to the screening by the atmosphere itself, at the earth's surface, radiation wavelengths are at 3200 angstroms and greater.

In the figure, there is shown connected to irradiator 18 sample conditioner 24 which is useful, depending on the nature of the sample from gas 10. The conditioner 24 is adapted to vary all or any of the properties of the sample: temperature, oxygen content, humidity level or presence or absence of nonreactive particles. For example, an oxygen supply is provided through line 26 to the conditioner 24 to feed oxygen into the gas sample, if necessary, to effect reaction in the irradiator 18 of the oxyreactive hydrocarbons. Ordinarily, the gas sample may contain molecular oxygen in adequate concentration, i.e. at least a stoichiometric equivalent and more desirably about ten times the quantity of hydrocarbon of oxygen, e.g., 10 to 1000 parts per million where hydrocarbon concentration is between 1 and 100 parts per million should be present to insure oxypolymerization at a satisfactory rate. Often more or less atmospheric quantities of oxygen, e.g., from 15% to 30% by volume will be present in the gas sample. With the oxygen supply connected at 26 as shown, the oxygen content of the gas sample being processed can be increased to virtually any level.

It has been mentioned above that molecularly disperse water, or alternatively humidity, has been found to have an effect on reaction rate. Accordingly, the conditioner 24 may be provided with a humidity control through line 28. Humidity control may be effected through use of a water nebulizer or other delivery device affording control over dispersion, timing, and quantity of water delivery into the gas sample within conditioner 24.

Many gases to be evaluated will already be at desired humidity levels and addition through line 28 will be unnecssary. Effective chemical conversion of oxyreactive hydrocarbons under far ultraviolet irradiation into measurable particulates has been found to occur at desirable rates, e.g., in 3 to 100 seconds at moderate radiation dosages, when the sample contains molecularly disperse water in amounts providing a relative humidity between 0 and 99%. The gas sample may of course be dried by operating line 28 as a dessicator.

The temperature of the gas sample may be varied to effect particular reaction conditions. For example to determine the nature of a source from a sample containing a mix of hydrocarbons, the temperature of the flowing gas may be progressively increased, e.g., between 5 and 95° C. whereby the critical reactivity level for each of the contained hydrocarbons will be reached and particulates produced in varying amounts accordingly, whereby the nature of the source may be characterized. Thus, condition 24 may include a heat exchanger indicated at 30 in the drawing.

A further modification of the incoming gas stream to the irradiator 18 may be effected in conditioner 24 by dispersing nonreactive particulates, e.g. salt crystals, submicron styrene polymer or other air suspendable matter into the gas sample. Thus nonreactive additives may be supplied to the conditioner 24 through line 32 to provide for selective and specialized conditioning of sampled gases. Of course the gas stream may be filtered in conditioner 24 to remove unwanted matter.

It is to be noted that use of each of the foregoing additives is dependent on the characteristics of the sample. In all cases the addition is desirably accomplished upstream of the irradiator 18, e.g., in conditioner 24 so that a homogeneous sample is irradiated.

On passing from the conditioner 24 along line 34 and irradiator 18, the gas sample, after the photochemical reaction is passed along line 36 into a detection device. Prior to entry into the sensor 38, the sample may be held briefly in a dwell chamber 40 to allow for agglomerate build-up in the sample.

Sensor 38 is representative of any of the various devices useful for qualitatively or quantitatively ascertaining the presence of particulates in a gas stream. The irradiator 18 is typically operated to combine from 100 to 5000 monomer units into a larger chemical entity, and which may or may not contain chemically combined nitrogen, sulfur etc., to agglomerate these into particulates which are readily detected, e.g., by light scattering tests. The particulates produced herein may be considered to be a synthetically produced aerocolloid, a dispersion in a gas of essentially nonsettling particulate matter. This particulate matter is of sufficient dimension to scatter visible light. Accordingly, with suitable photometric instrumentation, the quantity of particulate matter can be determined. Once detected, the transduction of the information into a signal, auditory or visual or continuous recording is easy. The sensor 38 may be calibrated to give a direct reading of the aerosol concentration in comparison with that prior to irradiation and be made to report only levels exceeding a predetermined threshold. Alternatively, the particulates may be concentrated by precipitation onto a surface, e.g., by or impaction and evaluated there photometrically, whereby the sensitivity of the present method and apparatus is tremendously increased. Following measurement and for separation of the particulates the gas sample is drawn from the apparatus through line 42 to flow control 22 and line 44 to suction pump 20.

In carrying out the method of the invention as with the just described apparatus, a selected portion of a gas from a suspected source vicinity is passed or drawn through an irradiation zone. Prior to such passage the sample is preferably conditioned to a predetermined temperature, pressure, content of oxygen, humidity and ambient particulates by appropriate additions and deletions, e.g., through filtering.

The conditioned sample is passed through the irradiation zone in a manner providing the desired dosage of radiation. The dosage will be dependent on the degree of molecular weight increase desired, e.g., 100 or 5000 combined monomer units, the molecular weight and hence reactivity of the predominant monomer species, e.g., $C_5$ or $C_8$ or other, rapidity of reaction desired, et cetera.

Following radiation, the now sensible particulate-containing gas stream is passed to the sensor for detection.

EXAMPLE

A gas containing a hydrocarbon source providing an ambient gas containing 1 to 100 parts per million of the oxyreactive hydrocarbon xylene is treated to convert the hydrocarbon into a detectable particulate form. The gas at 25° C. and 760 mm. Hg pressure is adjusted to a relative humidity of 50%. Oxygen content is approximately 20% by volume. The sample is flowed steadily through an annular passage-way surrounding a quartz-mercury vapor lamp emitting radiation 96% at 2537 A. Power supplied is between 5 and 10 watts per 600 milliliters of the gas. The passage-way is sized so that as radiation intensity decreases outwardly from the lamp the velocity of the gas along the passage also decreases due to laminar flow conditions, so that radiation of all parts of the sample is quite uniform. A formation of particles easily detectable by photometer is obtained in 10 to 20 seconds. Particle size is estimated at between 0.5 and $1\mu$. The particulates are precipitated by impaction on a slide and tested for solubility in xylene (not soluble), and acetone (soluble), indicating photochemical conversion of the xylene at least partially into compounds or radicals having a great tendency to polymerize.

The procedures of the example are adaptable to explosion prevention, oil discovery or personal surveillance work by appropriate selection of the medium for sampling, e.g., the atmosphere adjacent oil-bearing sands or in restricted access areas. For leakage detection, the sample receiver is merely run across the surface intended to be free of hydrocarbon whence a leak will activate the sensor to signal leakage.

When surveillance or exploration is being carried out, multiple sampling in different vicinities about a known source will reveal the location of the source by relative concentration of hydrocarbon, so that the source location may be pinpointed.

I claim:

1. Method of detecting in a gas a localized source of molecularly disperse and normally undetectable oxyreactive gaseous hydrocarbons which includes taking an oxygen containing gas sample in the vicinity of the suspected source location, irradiating the sample with far ultraviolet radiation to combine oxyreactive hydrocarbons therein into detectable particulates comprising said hydrocarbons and at least $0.1\mu$ in diameter, and measuring the irradiated sample for the presence or absence of said particulates to correspondingly indicate the presence or absence of oxyreactive hydrocarbons in the sample.

2. Method according to claim 1, in which said irradiating is carried out with radiation below 2850 angstroms.

3. Method according to claim 1 including also maintaining molecularly disperse water in said sample during irradiation.

4. Method according to claim 1 including also providing reaction centers in said sample during irradiation.

5. Method according to claim 1, in which said particulates comprise oxygen-containing polymers of said hydrocarbons.

6. Method according to claim 5, in which said oxyreactive hydrocarbons are chemically combined into polymers having molecular weights from 100 to 5000 times greater than their hydrocarbon precursors.

7. Method according to claim 6, in which said oxygen is chemically combined with said hydrocarbons in forming said larger molecules.

8. Method according to claim 6 including further agglomerating said larger molecules into detectable particulates.

9. Method according to claim 8, in which said measuring comprises ascertaining the light-scattering properties of the sample.

10. Method according to claim 9 including also sensing the presence of light-scattering matter in said sample to reveal the location of said source.

11. Method of measuring in an oxygen-containing gas a localized source of molecularly disperse and normally undetectable oxyreactive hydrocarbons at concentrations of less than 100 parts per million which includes taking a sample of the gas in the vicinity of the suspected source location, irradiating the sample with far ultraviolet radiation less than 2850 angstroms in wavelength, chemically combining the oxygen and oxyreactive hydrocarbons present into polymers combining said polymers into detectable particulates comprising said polymers and at least $0.1\mu$ in diameter, measuring the irradiated sample for the presence or absence of said particulates to correspondingly indicate the presence or absence of oxyreactive hydrocarbons in the localized gas source sample thus to measure said source for said hydrocarbons.

12. Method according to claim 11 including also processing multiple samples from different vicinities to pinpoint the location of said source.

13. Method acording to claim 11, in which said radiation has a wavelength between 2000 and 2850 angstroms.

14. Method according to claim 13, in which said gas sample contains at least 10 parts per million of oxygen per part of oxyreactive hydrocarbon.

15. Method according to claim 14, in which said gas sample contains between 15% and 30% by volume of oxygen.

16. Method according to claim 15 including also maintaining in said gas sample sufficient molecularly disperse water during irradiation to provide a humidity level between 0 and 99%.

17. Method according to claim 16 including also maintaining the gas sample during irradiation at a temperature between 5° and 95° C.

18. Method according to claim 17 including also maintaining in the gas sample during irradiation, finely divided suspended particles to act as reaction centers.

19. Method according to claim 17 including irradiating said sample sufficiently to produce particulates having a particle size between $0.1\mu$ and $1\mu$.

References Cited

UNITED STATES PATENTS

| | | | |
|---|---|---|---|
| 2,558,844 | 7/1951 | Gray et al. | 204—162 |
| 3,236,897 | 2/1966 | Hornig et al. | 204—162X |
| 3,288,697 | 11/1966 | Whitson et al. | 204—162X |

BENJAMIN R. PADGETT, Primary Examiner

U.S. Cl. X.R.

23—254; 204—162